(12) United States Patent
Price et al.

(10) Patent No.: US 8,146,002 B2
(45) Date of Patent: Mar. 27, 2012

(54) SCREEN SHARING SESSION WITH SELECTIVE POP-UPS

(75) Inventors: Christopher D. Price, Lexington, KY (US); William M. Quinn, Lexington, KY (US); Amy D. Travis, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 502 days.

(21) Appl. No.: 11/297,495

(22) Filed: Dec. 8, 2005

(65) Prior Publication Data

US 2007/0136686 A1 Jun. 14, 2007

(51) Int. Cl.
*G06F 3/00* (2006.01)
(52) U.S. Cl. .......................... 715/755; 715/808; 715/759
(58) Field of Classification Search .................. 715/808, 715/867, 755, 759
See application file for complete search history.

(56) References Cited

U.S. PATENT DOCUMENTS

| | | | | |
|---|---|---|---|---|
| 5,250,929 A * | 10/1993 | Hoffman et al. | ............... | 715/823 |
| 5,758,110 A * | 5/1998 | Boss et al. | ..................... | 715/751 |
| 5,963,206 A * | 10/1999 | Ulrich et al. | .................. | 715/788 |
| 6,212,547 B1 * | 4/2001 | Ludwig et al. | ................ | 709/204 |
| 6,549,440 B2 | 4/2003 | Tassitino, Jr. et al. | | |
| 6,570,590 B1 | 5/2003 | Dubrow et al. | | |
| 6,981,223 B2 * | 12/2005 | Becker et al. | ................. | 715/753 |
| 7,028,266 B2 * | 4/2006 | Ben-Shachar et al. | ........ | 715/790 |
| 7,047,501 B2 * | 5/2006 | Morcos et al. | ................ | 715/779 |
| 7,159,178 B2 * | 1/2007 | Vogt et al. | ..................... | 715/733 |
| 7,269,162 B1 * | 9/2007 | Turner | .......................... | 370/352 |
| 2003/0154250 A1 * | 8/2003 | Miyashita | ..................... | 709/204 |
| 2003/0189601 A1 | 10/2003 | Ben-Shachar et al. | | |
| 2004/0001102 A1 * | 1/2004 | Blaschke et al. | .............. | 345/789 |
| 2004/0024819 A1 | 2/2004 | Sasaki et al. | | |
| 2004/0024890 A1 | 2/2004 | Back et al. | | |
| 2004/0034874 A1 | 2/2004 | Hord et al. | | |
| 2004/0068521 A1 | 4/2004 | Haacke et al. | | |
| 2004/0075619 A1 | 4/2004 | Hansen | | |
| 2004/0162144 A1 * | 8/2004 | Loose et al. | ..................... | 463/42 |
| 2004/0189712 A1 * | 9/2004 | Rundell | ........................ | 345/808 |
| 2004/0228531 A1 * | 11/2004 | Fernandez et al. | ........... | 382/187 |
| 2005/0033817 A1 | 2/2005 | Wei | | |
| 2005/0055416 A1 * | 3/2005 | Heikes et al. | ................. | 709/207 |
| 2005/0066290 A1 * | 3/2005 | Chebolu et al. | .............. | 715/808 |
| 2005/0086290 A1 * | 4/2005 | Joyce et al. | ................... | 709/202 |
| 2005/0256797 A1 * | 11/2005 | Tyulyaev | ........................ | 705/37 |
| 2006/0092978 A1 * | 5/2006 | John et al. | ..................... | 370/473 |
| 2006/0190831 A1 * | 8/2006 | Kelso et al. | ................... | 715/764 |
| 2006/0242581 A1 * | 10/2006 | Manion et al. | ................ | 715/733 |

OTHER PUBLICATIONS

Berry et al., "Role-based control of shared application views", ACM (Oct. 2005, pp. 1-10).*
Screen shots of Microsoft Word (pp. 1-2, 2003).*
Screen shots of Microsoft Outlook (pp. 1-3, 2003).*

* cited by examiner

*Primary Examiner* — Doon Chow
*Assistant Examiner* — Le Nguyen
(74) *Attorney, Agent, or Firm* — Ayla A. Lari; Hoffman Warnick LLC (57) ABSTRACT

A method, system, and computer program product for providing a pop-up repelling region (e.g., frame) for use in a screen sharing session that includes providing, or creating a region on a screen, during a screen sharing session, that includes a view of at least one application within the region and repelling from the view in the frame of all other applications.

20 Claims, 11 Drawing Sheets

SCREEN SHARING SESSION WITH SELECTIVE POP-UPS

BACKGROUND OF THE INVENTION

1. Field of the Invention

The present invention relates generally to electronic network real-time conferencing (e.g., e-meetings). More specifically, the present invention provides a method, system, and computer program product for providing a pop-up repelling frame for use during screen sharing in an e-meeting.

2. Background Art

Currently, e-meeting applications allow two or more meeting attendees to share in the current use of a single software application during the e-meeting. That is more than one meeting attendee at two separate screens may view the same, single application concurrently shown (i.e., screen sharing). Shortcomings in current e-meeting systems abound however.

During an e-meeting, applications can send a window that automatically "pops up" (i.e., "pop-up window") onto the screen during the session. Pop-up windows may include an instant message, any type of alert or notification, and the like. For example, during an e-meeting any instant messaging system "pop-up" messages ("pop-ups") will appear on the screen, wherein all the meeting attendees can see the "pop-up" message on the screen. Similarly, a calendar application may send a pop-up window of a calendar alert. Other applications send various alerts in the format of a pop-up window. Often attendees forget, or do not elect, to turn off these other applications prior to the e-meeting. This may prove embarrassing, as well as, being disruptive to the screen sharing meeting. Conversely, an attendee may, in fact, wish to have certain, or all, "pop-up" messages shared with the other e-meeting attendees. In addition, the person sharing their screen may want to see the pop-up window but not have it shared with the other attendees, so they want an obvious way to be able to prevent particular windows (e.g., messages) from being shared, while still being able to view the windows themselves.

Some e-meeting applications allow only a single application to be shared during the e-meeting. Similarly, while some applications "gray" out the contents of pop-up windows, the outline frame of the pop-up will still block the vision of the shared screen. Additionally, in order to have a second (i.e., additional) application be shared during the e-meeting, the attendee must start and select all the applications prior to the start of the e-meeting. This does not address the occurrence where during the e-meeting, an attendee wishes to bring in and start sharing additional applications.

In view of the foregoing, there exists a need for a method, system, and computer program product for an improvement in e-meetings that provides a pop-up repelling frame for use in screen sharing.

SUMMARY OF THE INVENTION

In general, the present invention provides a method, system, and computer program product for providing a pop-up repelling frame for use in a screen sharing session. In particular, a shared screen region is established in the present invention that is readily expandable to allow more than a single application to be viewed. The region is able to fully repel any pop-up windows that occur during the screen sharing session. Further, the region is adjustable both before, and during, the session in offering selectable repelling and/or allowance of any pop-ups that occur during the session.

A first aspect of the present invention provides a method for providing a pop-up repelling frame for use in screen sharing, comprising: providing a region on a screen, during a screen sharing session, wherein a view of a first application is viewable within the region; and repelling a view of a second application from entering the region.

A second aspect of the present invention provides a system for providing a pop-up repelling frame for use in screen sharing, comprising: a system for providing a region on a screen, during a screen sharing session, wherein a view of a first application is viewable within the region; and a system for repelling a view of a second application from entering the region.

A third aspect of the present invention provides a program product stored on a recordable medium for providing a pop-up repelling frame for use in screen sharing, which when executed comprises: program code for providing a region on a screen, during a screen sharing session, wherein a view of a first application is viewable within the region; and program code for repelling a view of a second application from entering the region.

A fourth aspect of the present invention provides a system for deploying an application for providing a pop-up repelling frame for use in screen sharing, comprising: providing a computer infrastructure being operable to: provide a region on a screen, during a screen sharing session, wherein a view of a first application is viewable within the region; and repel a view of a second application from entering the region.

A fifth aspect of the present invention provides computer software embodied in a propagated signal for providing a pop-up repelling frame for use in screen sharing, the computer software comprising instructions to cause a computer system to perform the following functions: providing a region on a screen, during a screen sharing session, wherein a view of a first application is viewable within the region; and repelling a view of a second application from entering the region.

BRIEF DESCRIPTION OF THE DRAWINGS

These and other features of this invention will be more readily understood from the following detailed description of the various aspects of the invention taken in conjunction with the accompanying drawings in which.

The drawings are merely schematic representations, not intended to portray specific parameters of the invention, and are not necessarily to scale. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a method, system, and computer program product for providing a pop-up repelling frame for use during screen sharing in an e-meeting. Specifically, the pop-up repelling frame, of the present invention, is a customizable region of the screen for use during screen sharing in an e-meeting, that is configurable so as to selectively repel any pop-up windows out of the region and to selectively allow pop-up windows into the region. The region, or frame, may repel, any application that includes calendar applications, instant messaging applications, or other applications that send alerts, messages, and/or any type of pop-up window. The frame is adapted so that additional (e.g., second, and third) applications could selectively be allowed into the frame, including pop-up windows, for the various meeting attendees to view. Similarly, in the case of repelled pop-up windows, the recipient of the pop-up windows may alternatively opt to be able to view the repelled pop-up windows only while the other members of the shared session are prevented from viewing the same repelled pop-up windows.

Figure 1:
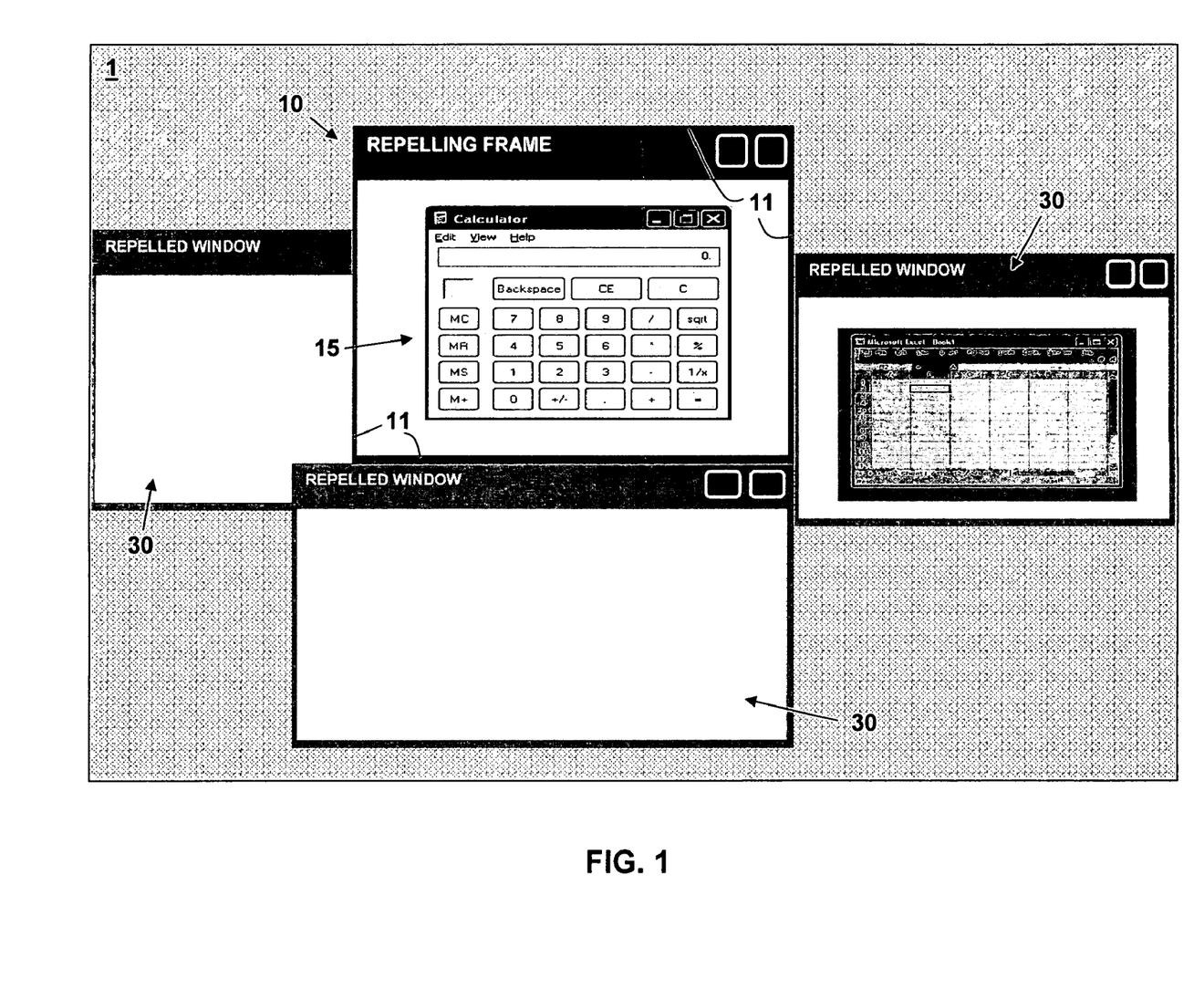
FIG. 1 depicts an illustrative computer screen with an embodiment of a pop-up repelling frame for use in screen sharing, in accordance with the present invention.
Figure 4A:
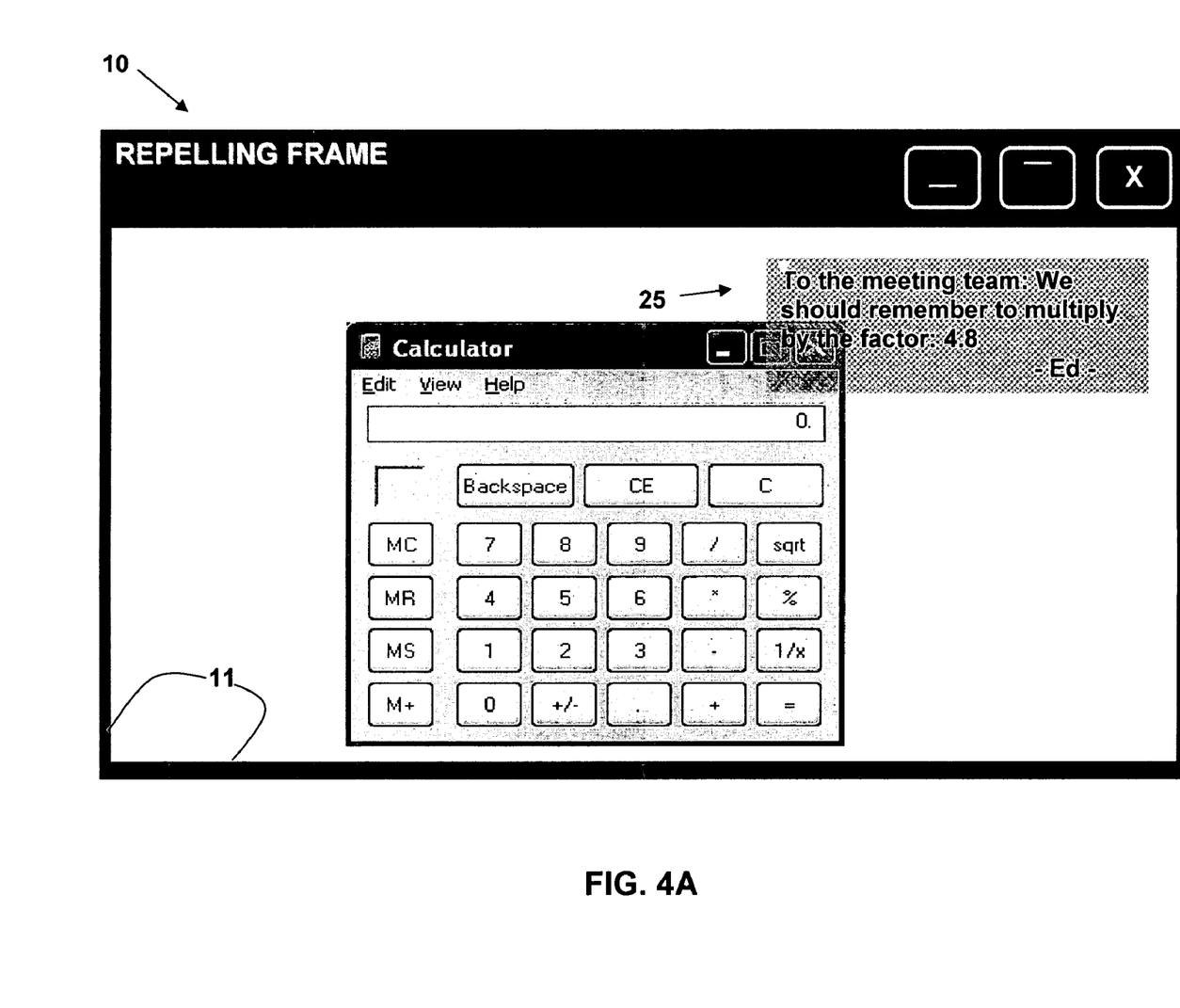
FIG. 4A depicts the view of the frame in FIG. 3 with a pop-up window allowed to appear within the frame, in accordance with the present invention.
Figure 4B:
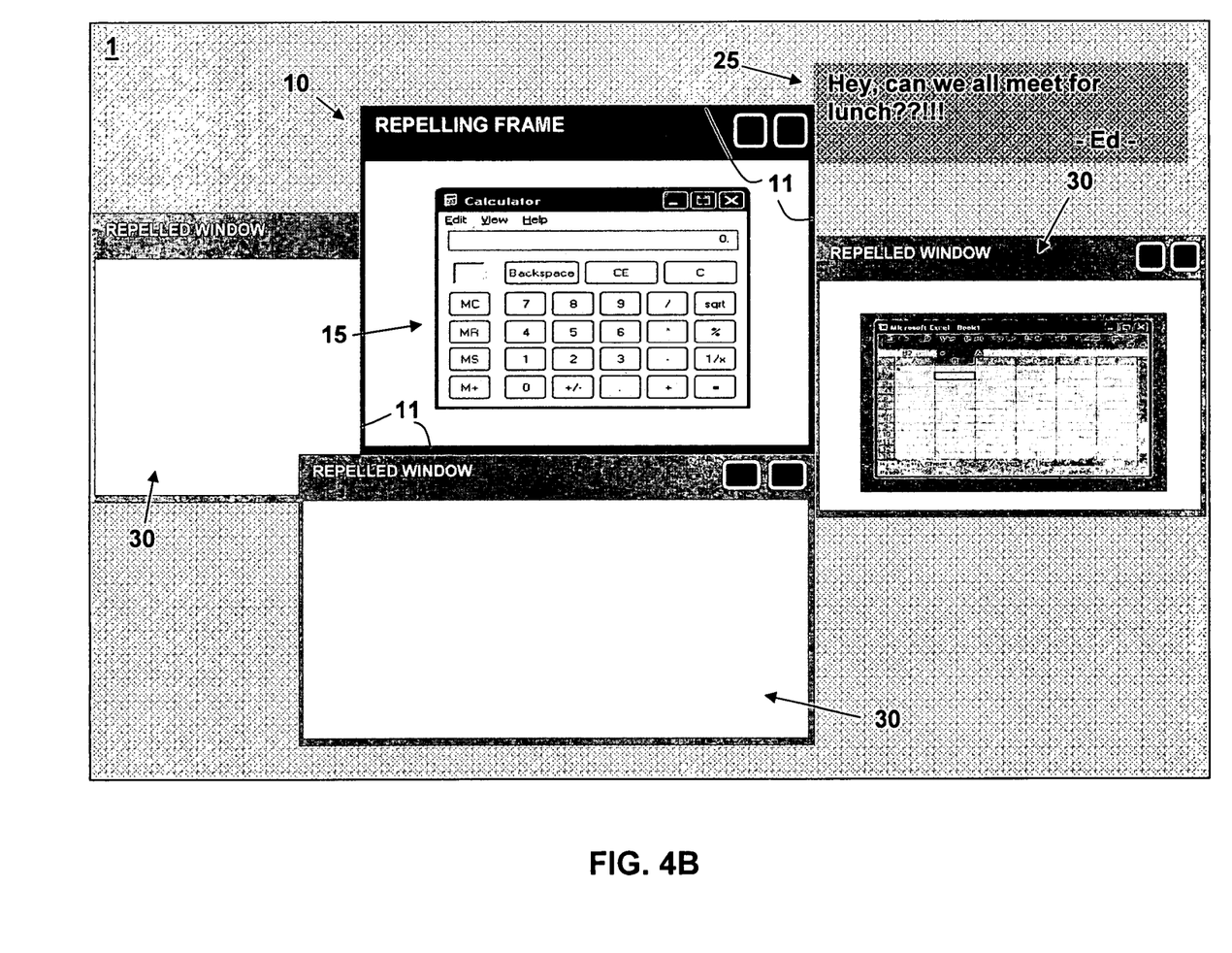
FIG. 4B depicts the view of the frame in FIG. 3 with a pop-up window rejected from being allowed to appear within the frame (i.e., repelled), in accordance with the present invention.

Turning to the figures, FIG. 1 depicts a screen view, denoted by a 1, that a meeting attendee 104 (i.e., user) (see FIG. 8) would typically see. The present invention creates a region, or repelling frame, 10, in this embodiment a rectangular frame having borders 11, that acts to repel and keep out, either automatically or selectively, unwanted views, or windows, of applications and pop-up windows 25 (FIG. 4B). That is numerous repelled windows 30, housing various unwanted views of application(s) and/or pop-up windows 25 are kept out, or repelled, out of the repelling frame 10. Similarly, the e-meeting attendees 104 are able to all share in the view within the repelling frame 10 which includes a selected application 15, or applications 15. In FIG. 1, the selected application 15 is a calculator, while one of the repelled windows 30 includes a spreadsheet.

Three general situations are addressed by the repelling frame 10 in the present invention. First, pop-up window(s) 25 for application(s) that a user 104 does not want to share during the session must be kept out of the repelling frame 10 (e.g., by moving them out of the region). Second, certain pop-up window(s) 25 for application(s) that a user 104 does want to share during the session and that existed prior to the sharing session must be addressed. Third, pop-up window(s) 25 for application(s) that are created (e.g., pop-up) during the sharing session are addressed. A subset of this third situation is to address the scenario wherein during the sharing session, the user 104 wishes to change their selection regarding whether to allow or reject (i.e., repel) a pop-up window 25 from their previous selection of allowance or rejection.

The present invention may implement window "hooking" to catch various window events that are posted to applications on the desktop. For example, in Windows, manufactured by Microsoft, the WM_WINDOWSPOSCHANGING event is sent to an application window just prior to its position changing (i.e., moved, resized, or re-Z-ordered). Similarly, a WM-CREATE event is sent when a new window is created. The repelling frame 10 can detect these events and then issue a MoveWindow to get the popup window 25 out of the repelling frame 10 (i.e., repelled). In this way, the pop-up window 25 could be viewed by the person who is hosting the sharing session, but not viewed by the other participants (see e.g., FIG. 4B).

Alternatively, instead of issuing a MoveWindow, the present invention may later alter the contents of the WM_WINDOWPOSCHANGING message.

In platforms that do not have a window hooking method, the present invention may, alternatively, keep track of the current window list from when the repelling frame 10 starts and then with simple polling when grabbing the screen to share, check to see if additional windows have been created and check to verify if they are overlapping the repelling frame 10.

Figure 2:
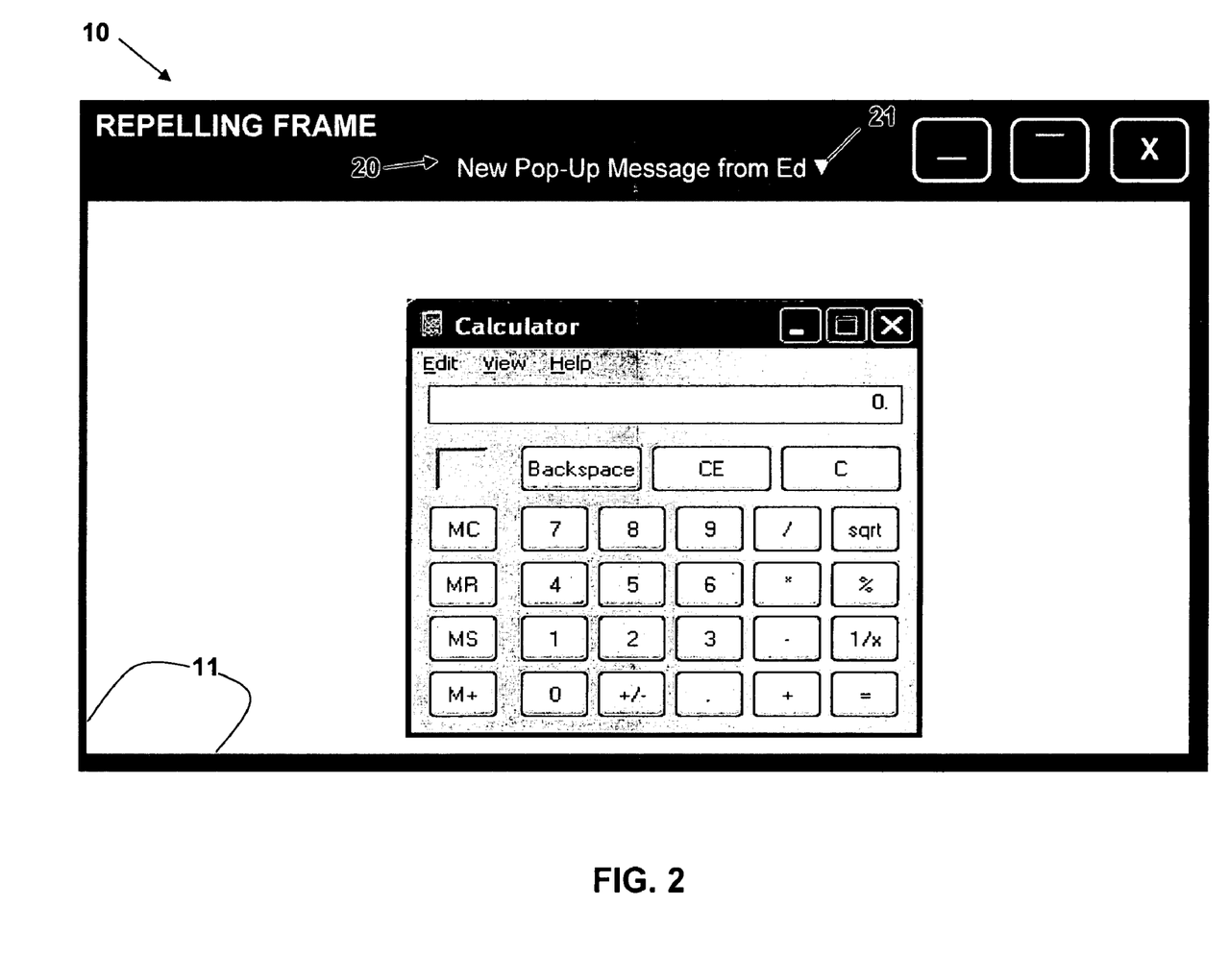
FIG. 2 depicts a close up view of the frame in FIG. 1 with a pop-up window, in accordance with the present invention.
Figure 3:
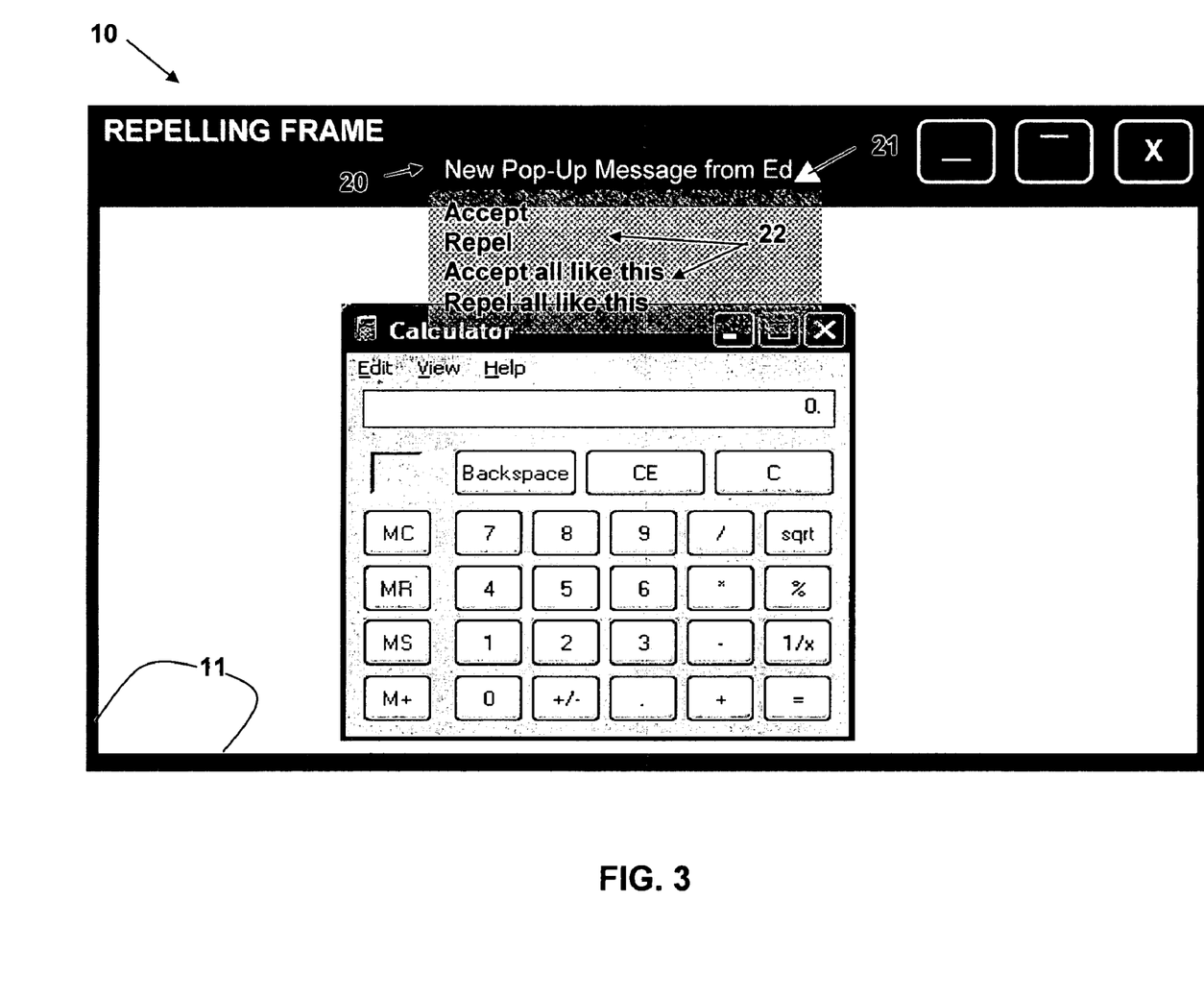
FIG. 3 depicts the view of the frame in FIG. 2 with a pop-up window query, in accordance with the present invention.

Thus, during a shared session, the invention may create a window which could appear as a pop-up window prompt 20 as in FIG. 2, prior to the actual pop-up window 25 (FIGS. 4A-4D) that signifies that a pop-up window 25 is attempting to enter the repelling frame 10. For example, the text in the pop-up window prompt 20 may say "New Pop-up window from Ed". The popup message prompt 20 may include a drop down arrow 21, which when selected offers various queries 22 to the user 104, as shown in FIG. 3. The user 104 is able to select from the various queries 22 what action should be taken with the awaiting pop-up window 25, and, if applicable, future pop-up windows 25. The future pop-up windows 25 may, for example, be from the same application, or the same message sender, or the like.

For example, the queries 22 may include "Accept"; "Repel"; "Accept All Like This"; and, "Repel All Like This", as shown in FIG. 3. If the user 104, for example, selects "Accept" or "Accept All Like This", then the pop-up window 25 is allowed to appear within the repelling frame 10, as shown in FIG. 4A. The pop-up window 25, in the embodiment shown, is a reminder to all the meeting attendees 104 from "Ed" that says, "To the meeting team: We should remember to multiply by the factor: 4.8". Understandably, it is desirable in the example, that the meeting attendees 104 would want to be able to see the message 25, as a reminder, concurrently with the application 15, which in the case is the calculator.

Clearly, other queries 22 may be used to control the repelling action of the repelling frame 10. For example, various queries 22 may include: "Ask regarding all pop-up Windows", which would be a query 22 that, if selected, would then cause all succeeding pop-up windows 25 to first have a prompt 20.

"Accept all pop-up windows into the sharing frame without asking", which would be a query 22 that, if selected, would then cause all succeeding pop-up windows 25 to automatically be allowed in the repelling frame 10 without a prior prompt 20.

"Repel all pop-up windows without asking", which would be a query 22 that, if selected, would then cause all succeeding pop-up windows 25 to be automatically repelled from the repelling frame 10 without a prior prompt 20. As part of the repelling action, the pop-up windows 25 would be viewable outside of the repelling frame 10, by the person hosting the sharing session (FIG. 4B).

"Accept all pop-up windows pertaining to the application with focus", which would be a query 22 that, if selected, would then cause all succeeding pop-up windows 25 that pertain to the application(s) 15 to be accepted without a prior prompt 20.

"Accept all pop-up windows pertaining to the same application as the current pop-up", which would be a query 22 that, if selected, would then cause all succeeding pop-up windows 25 that pertain to the same application as the current message 25 to be accepted without first having a prior prompt 20.

"Repel all pop-up windows from the same application as the current pop-up", which would be a query 22 that, if selected, would then cause all succeeding pop-up windows 25 that pertain to the same application as the current message 25 to be automatically repelled.

"Accept all pop-up windows from some other application that is running", which would be a query 22 that, if selected, would then cause all succeeding pop-up windows 25 that pertain to an application that, for example, started before the sharing session started and/or an application that previously has been repelled, to be accepted.

"Repel all pop-up windows from some other application that is running", which would be a query 22 that, if selected, would then cause all succeeding pop-up windows 25 that pertain to an application that, for example, started before the sharing session started and/or an application that previously has been accepted, to be repelled.

Clearly, other combinations of prompts 20 and/or queries 22 may be employed that allow the user 104 to selectively allow and selectively repel pop-up windows 25 and to adjust this customization of the repelling frame 10 during a session.

Thus, when a pop-up window 25 appears that would interrupt the repelling frame 10, and if the user 104 has marked that they would be prompted, the user 104 is alerted when a new pop-up window 25 appears, and can click to be provided choices such as accepting the message 25 into the repelling frame 10, repel the message 25, or choose other options (e.g., "accept all like this one"), and the like, as depicted in FIG. 3.

The user 104 can alternatively use a keyboard option (not shown) to repel "on" and "off" globally for all future pop-up windows 25. Dragging any individual pop-up window 25 into the repelling frame 10 shows the message 25 and gives the user the option 104 to allow other windows in this application into the repelling frame 10.

For any pop-up window 25 that the user 104 selects that it is acceptable to show the pop-up window 25, the pop-up repelling algorithm that is associated with the window for that particular, or group, of pop-up window 25 would be removed from that window. Any window that the user 104 wants repelled will be pushed outside the repelling frame 10. Conversely, pop-up windows 25 that are completely outside the repelling frame 10 are displayed normally.

Various embodiments of the present invention allow for the user 104 to selectively accept and selectively repel pop-up windows 25 during a shared session. As discussed above the selectivity may be conducted via various screen prompts. Alternatively, the selectivity may be conducted, for example, via the dragging of the borders 11 of the repelling frame 10. Similarly, the selectively of subsequently allowing into the repelling frame 10, of a previously rejected pop-up window 25 may be conducted by "dragging" into and within the repelling frame 10 the, now accepted, pop-up window 25.

FIGS. 4A through 4D show variations of various views of pop-up windows 25. FIG. 4A depicts a pop-up window 25 that has been accepted for viewing within the repelling frame 10 by all the users 104 of the shared session. For example, pop-up window 25 that contains the message "To the meeting team: We should remember to multiply by the factor: 4.8—Ed—" would understandably be desirable to be viewed by all users 104. Hence, it is accepted into the repelling frame 10.

FIG. 4B provides an alternative scenario wherein the recipient of a pop-up message 25 wants to see and read the pop-up message 25, but conversely does not want any other user 104 of the shared session to read the pop-up message 25, nor to even know that the pop-up message 25 has arrived to the recipient user 104. For example, pop-up window 25 that contains the message "Hey, can we all meet for lunch??!!!—Ed—" would understandably be undesirable to be viewed by all users 104. Hence, it is rejected and repelled to outside the repelling frame 10. While the recipient user 104 may be able to see and read the pop-up window 25 (e.g., message), no other user 104 knows of the pop-up window 25.

Figure 4C:
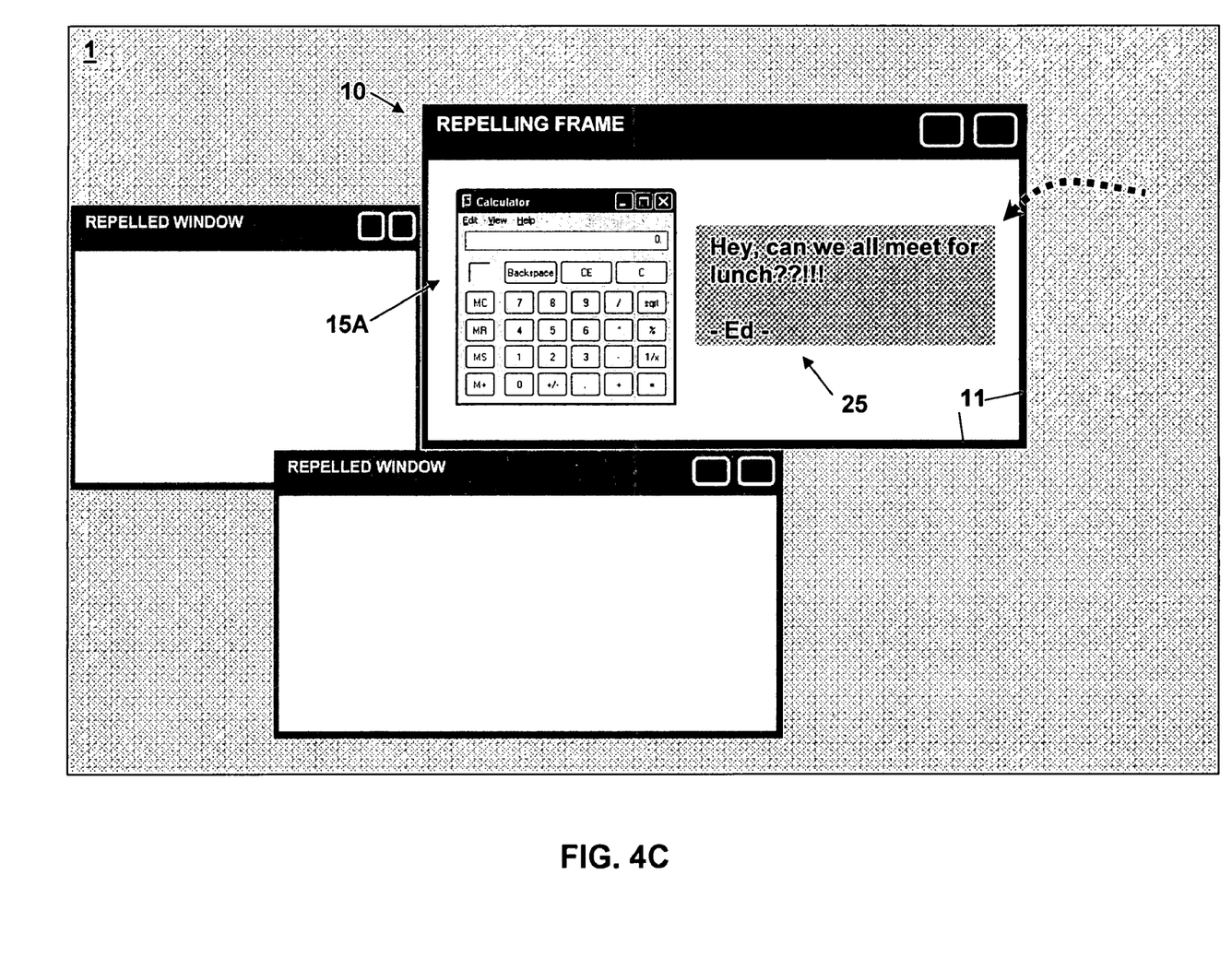
FIG. 4C depicts the view of the frame in FIG. 4B with the rejected pop-up window subsequently being allowed to appear within the frame (e.g., dragged in), in accordance with the present invention.

FIG. 4C depicts a, not uncommon, scenario wherein a recipient user 104 after having seen and read a repelled pop-up window 25 subsequently decides that, in fact, the user 104 now wants to share the repelled pop-up window 25 with the other users 104 in the shared session. For example, with the pop-up window 25 from FIG. 4B, the user 104, having read the luncheon invitation from Ed, decides to then allow all the other users 104 to see and read the pop-up window 25. The recipient user 104 then opts to bring the pop-up window 25 (i.e., message "Hey, can we all meet for lunch??!!!—Ed—") within the repelling frame 10. This may be done, for example, by extending the borders 11 of the repelling frame 10 so as to surround the, now accepted, pop-up window 25, or the pop-up window 25 may be "dragged" into the repelling frame 10, or via similar methodologies.

Figure 4D:
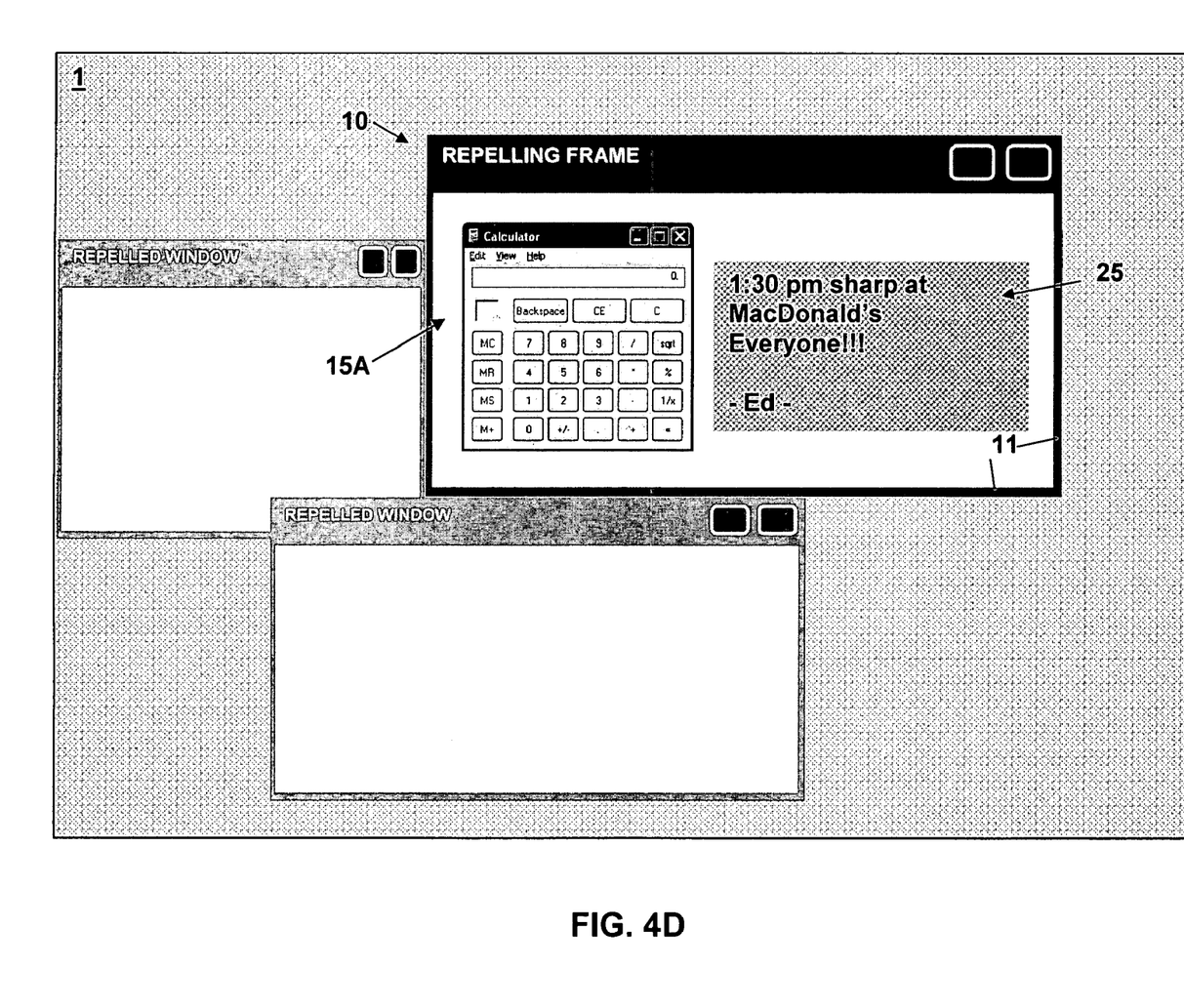
FIG. 4D depicts the view of the frame in FIG. 4C with a subsequent pop-up window (to the dragged-in pop-up window) being allowed to appear within the frame, in accordance with the present invention.

FIG. 4D depicts a scenario which may follow, for example, the view depicted in FIG. 4C. Having accepted and allowing the pop-up window 25 of the example in FIG. 4C to subsequently reside within the repelling window 10, then subsequent pop-up windows 25 may automatically appear within the repelling window 10. For example, the subsequent pop-up window 25 containing the message "1:30 pm sharp at Mac-Donald's Everyone!!!—Ed—" is accepted into the repelling frame 10 because the previous pop-up window 25 containing the message regarding lunch (FIG. 4C) was accepted into the repelling window 10.

Figure 5:
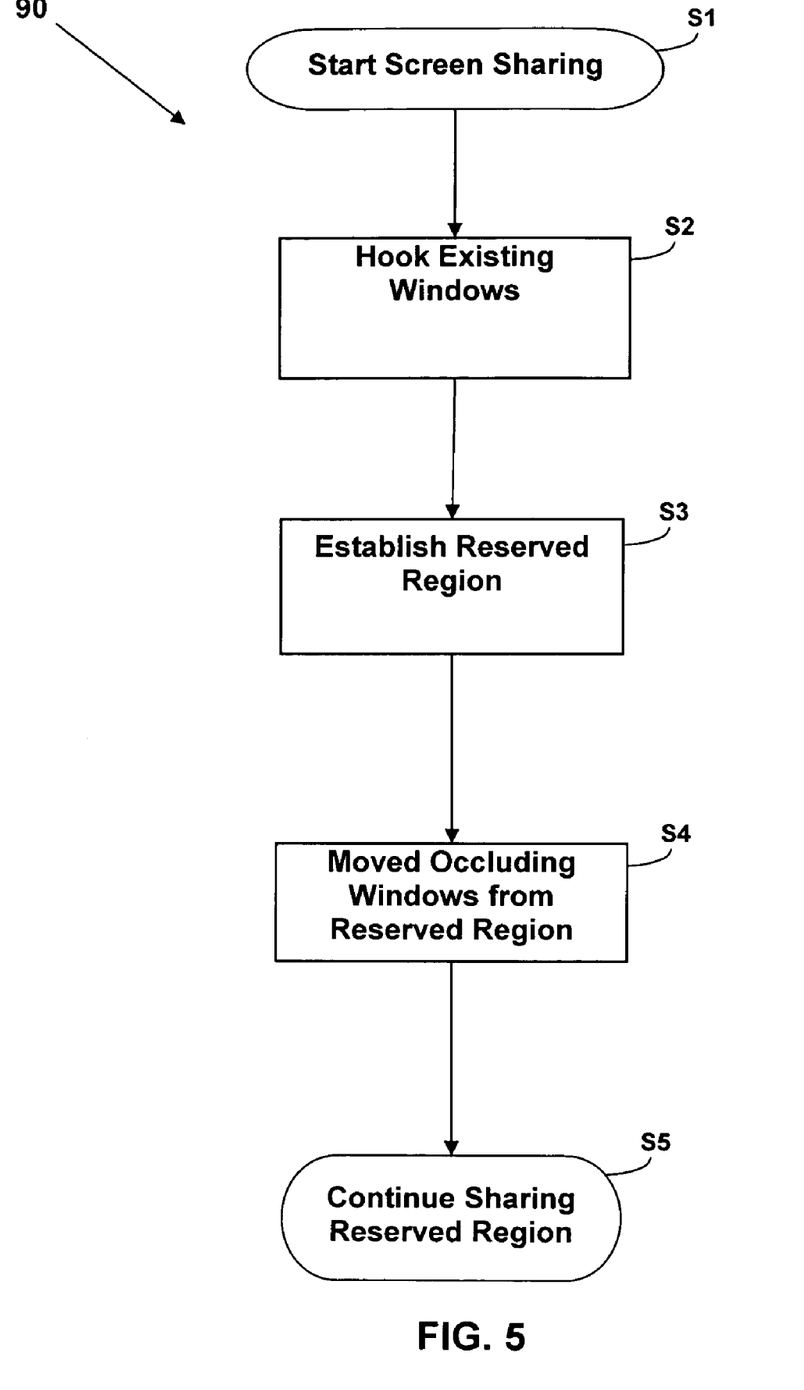
FIG. 5 depicts a flow diagram illustrating the process flow of a portion of a method in accordance with the present invention.

A flow diagram 90 illustrating the process flow of a method in accordance with the present invention is shown in FIGS. 5 though 7. In step S1, a screen sharing session is started by a user 104, or users 104. Upon the start of the screen sharing session, step S2 follows wherein all existing "windows", or frames, are hooked. Then in step S3, a repelling frame, or reserved region, (see e.g., FIG. 1) 10 is established. Once established, then in step S4 any occluding (i.e., blocking) windows are moved (i.e., repelled) outside of the repelling frame, or reserved region, 10. This establishes a typical repelling frame 10 for use during a screen sharing session, in accordance with the present invention.

Figure 6:
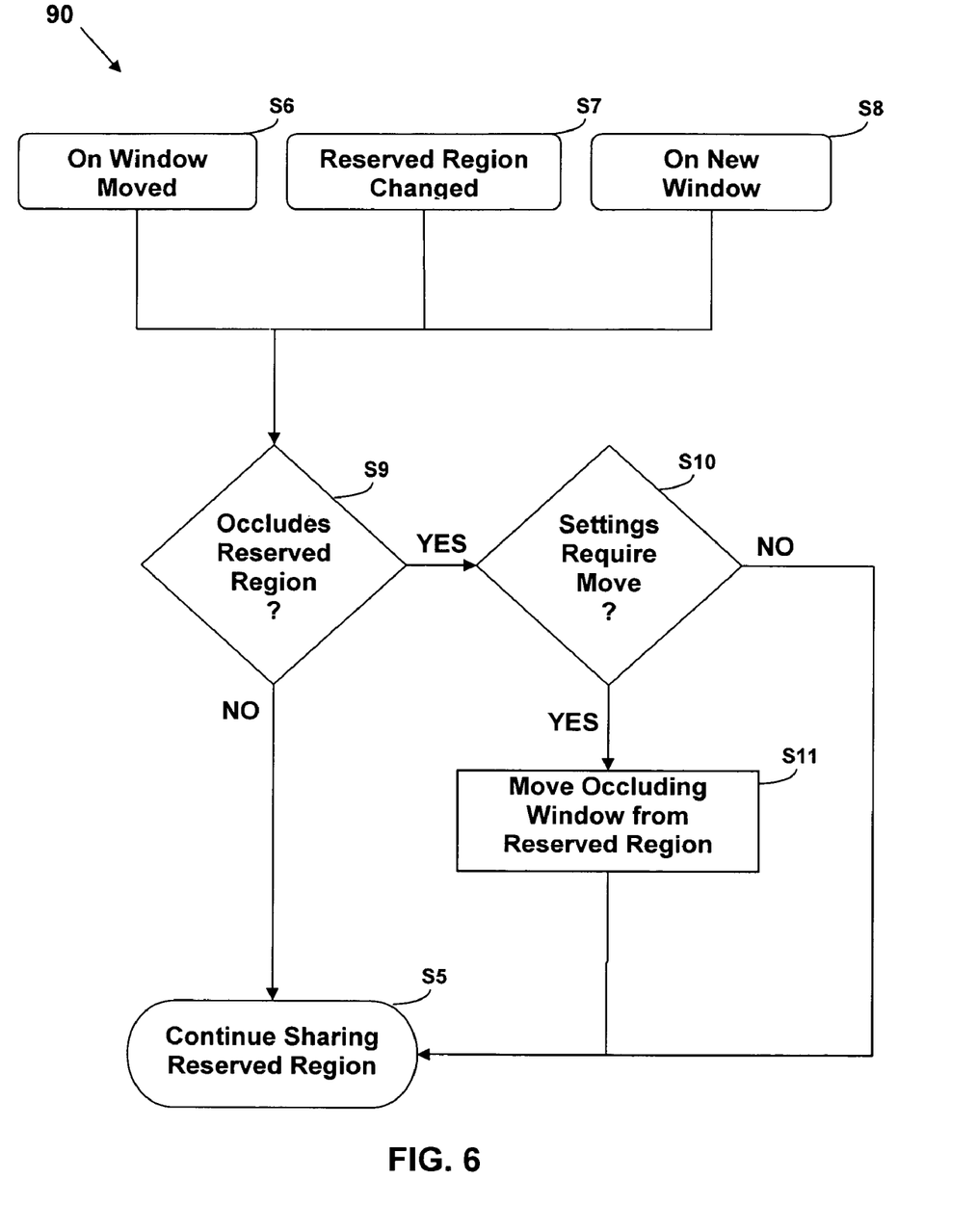
FIG. 6 depicts a flow diagram illustrating the process flow of a portion of a method in accordance with the present invention.

FIG. 6 illustrates a portion of the process flow of the method, when certain actions happen during a screen sharing session. In the event of any window being moved, step S6; the repelling frame 10 has changed, step S7; or, upon a new window being created, step S8; then step S9 follows wherein the method queries whether or not the repelling frame 10 is occluded. If the repelling frame 10 is not occluded, then step S5, again, follows, wherein a screen sharing session may continue, in accordance with the present invention. If the repelling frame 10 is occluded, then step S10 asks whether the settings require a move of the occluding window(s). If the answer to step S10 is negative, again, a screen sharing session may continue, step S5. If a move is required, then step S11 causes the occluding window(s) to be moved from the repelling frame 10. Finally, step S5 follows again wherein the screen sharing session continues.

Figure 7:
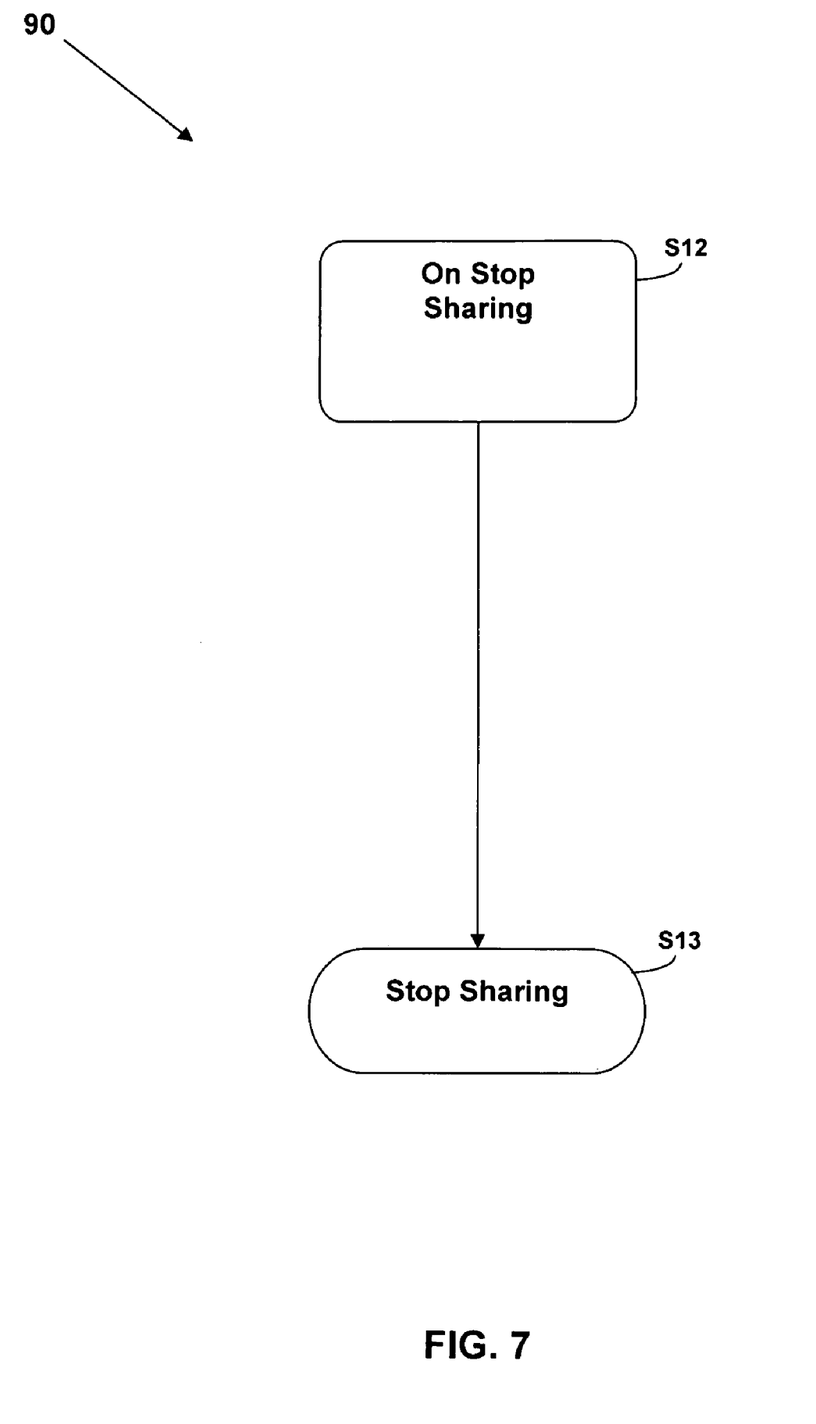
FIG. 7 depicts a flow diagram illustrating the process flow of a portion of a method in accordance with the present invention.

FIG. 7 merely illustrates a method for the situation when a stoppage of the screen sharing occurs, step S12. Upon a prompt from one, or more, users 104, the sharing session is then stopped, step S13.

The present invention ultimately provides the advantage of a pop-up repelling frame for use during a screen sharing session.

Figure 8:
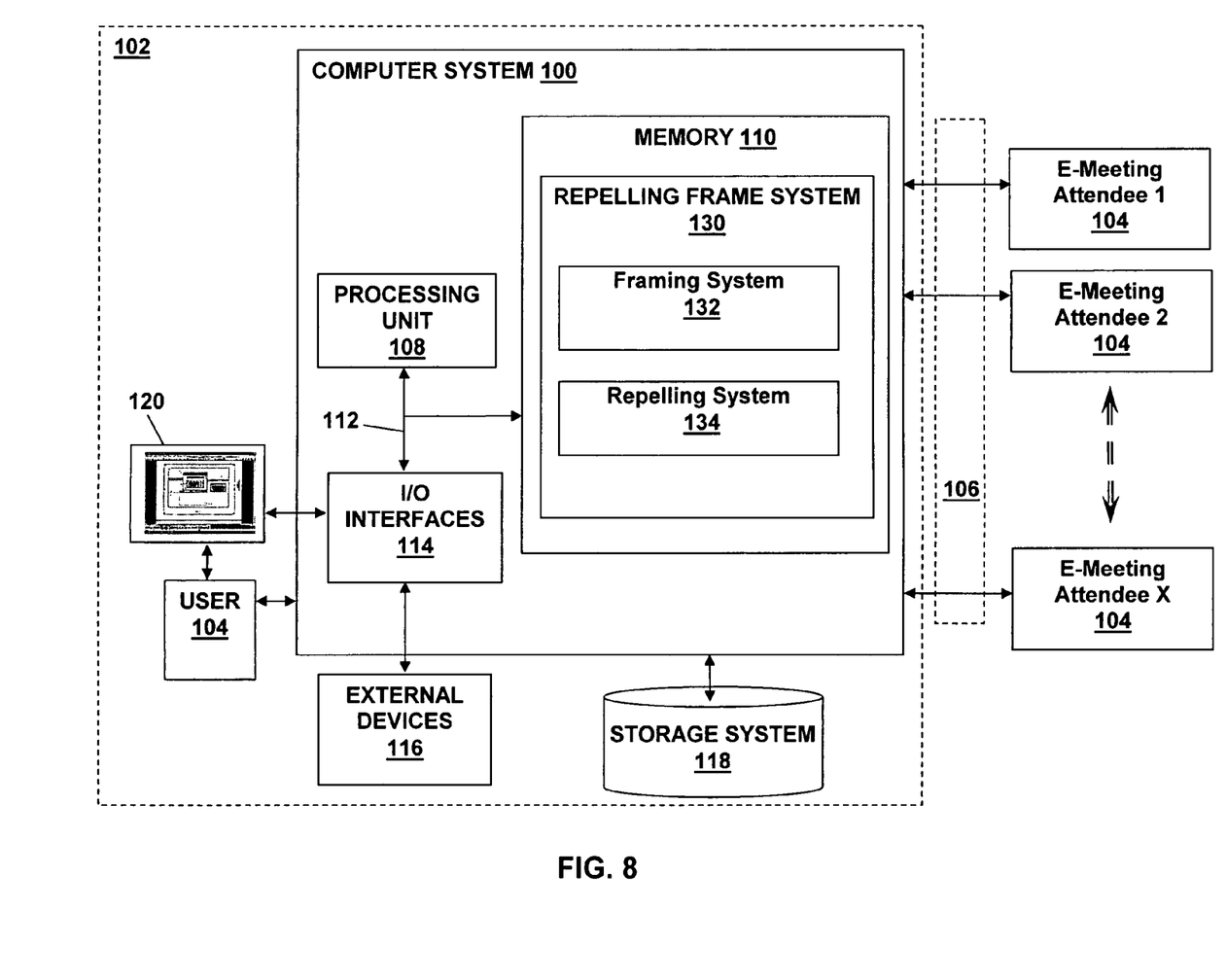
FIG. 8 depicts a computer system for implementing the method of the present invention.

A computer system 100 for providing a pop-up repelling frame for use in a screen sharing session in accordance with an embodiment of the present invention is depicted in FIG. 8. Computer system 100 is provided in a computer infrastructure 102. Computer system 100 is intended to represent any type of computer system capable of carrying out the teachings of the present invention. For example, computer system 100 can be a laptop computer, a desktop computer, a workstation, a handheld device, a server, a cluster of computers, etc. In addition, as will be further described below, computer system 100 can be deployed and/or operated by a service provider that provides a service for a pop-up repelling frame for use in a screen sharing session, in accordance with the present invention. It should be appreciated that a user (e.g., e-meeting attendee(s)) 104 can access computer system 100 directly, or can operate a computer system that communicates with computer system 100 over a network 106 (e.g., the Internet, a wide area network (WAN), a local area network (LAN), a virtual private network (VPN), etc). In the case of the latter, communications between computer system 100 and a user-operated computer system can occur via any combination of various types of communications links. For example, the communication links can comprise addressable connections that can utilize any combination of wired and/or wireless transmission methods. Where communications occur via the Internet, connectivity can be provided by conventional TCP/IP sockets-based protocol, and an Internet service provider can be used to establish connectivity to the Internet.

Computer system 100 is shown including a processing unit 108, a memory 110, a bus 112, and input/output (I/O) interfaces 114. Further, computer system 100 is shown in communication with external devices/resources 116 and one or more storage systems 118. In general, processing unit 108 executes computer program code, such as a Repelling Frame System 130, that are stored in memory 110 and/or storage system(s) 118. While executing computer program code, processing unit 108 can read and/or write data, to/from memory 110, storage system(s) 118, and/or I/O interfaces 114. Bus 112 provides a communication link between each of the components in computer system 100. External devices/resources 116 can comprise any devices (e.g., keyboard, pointing device, display (e.g., display 120, printer, etc.) that enable a user to interact with computer system 100 and/or any devices (e.g., network card, modem, etc.) that enable computer system 100 to communicate with one or more other computing devices.

Computer infrastructure 102 is only illustrative of various types of computer infrastructures that can be used to implement the present invention. For example, in one embodiment, computer infrastructure 102 can comprise two or more computing devices (e.g., a server cluster) that communicate over a network (e.g., network 106) to perform the various process steps of the invention. Moreover, computer system 100 is only representative of the many types of computer systems that can be used in the practice of the present invention, each of which can include numerous combinations of hardware/software. For example, processing unit 108 can comprise a single processing unit, or can be distributed across one or more processing units in one or more locations, e.g., on a client and server. Similarly, memory 110 and/or storage system(s) 118 can comprise any combination of various types of data storage and/or transmission media that reside at one or more physical locations. Further, I/O interfaces 114 can comprise any system for exchanging information with one or more external devices/resources 116. Still further, it is understood that one or more additional components (e.g., system software, communication systems, cache memory, etc.) not shown in FIG. 8 can be included in computer system 100. However, if computer system 100 comprises a handheld device or the like, it is understood that one or more external devices/resources 116 (e.g., display 120) and/or one or more storage system(s) 118 can be contained within computer system 100, and not externally as shown.

Storage system(s) 118 can be any type of system (e.g., a database) capable of providing storage for information under the present invention. To this extent, storage system(s) 118 can include one or more storage devices, such as a magnetic disk drive or an optical disk drive. In another embodiment, storage system(s) 118 can include data distributed across, for example, a local area network (LAN), wide area network (WAN) or a storage area network (SAN) (not shown). Moreover, although not shown, computer systems operated by user 104 (e.g., e-mail recipient) can contain computerized components similar to those described above with regard to computer system 100.

Shown in memory 110 (e.g., as a computer program product) is a Repelling Frame System 130 for providing a pop-up repelling frame for use in a screen sharing session in accordance with embodiment(s) of the present invention. The Repelling Frame System 130 generally includes a Framing System 132 for providing a region on a screen that allows a view of at least one application to be viewed within the region, as described above. The Repelling Frame System 130 generally also includes a Repelling System 134 for repelling a view of a second application from entering the region, as described above.

The present invention can be offered as a business method on a subscription or fee basis. For example, one or more components of the present invention can be created, maintained, supported, and/or deployed by a service provider that offers the functions described herein for customers. That is, a service provider can be used to provide a service for providing a pop-up repelling frame for use in a screen sharing session, as described above.

It should also be understood that the present invention can be realized in hardware, software, a propagated signal, or any combination thereof. Any kind of computer/server system (s)—or other apparatus adapted for carrying out the methods described herein—is suitable. A typical combination of hardware and software can include a general purpose computer system with a computer program that, when loaded and executed, carries out the respective methods described herein. Alternatively, a specific use computer, containing specialized hardware for carrying out one or more of the functional tasks of the invention, can be utilized. The present invention can also be embedded in a computer program product or a propagated signal, which comprises all the respective features enabling the implementation of the methods described herein, and which—when loaded in a computer system—is able to carry out these methods.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

The present invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device), or a propagation medium. Examples of a computer-readable medium include a semiconductor or solid state memory, magnetic tape, removable computer diskette, random access memory (RAM), read-only memory (ROM), rigid magnetic disk and optical disk. Current examples of optical disks include a compact disk—read only disk (CD-ROM), a compact disk—read/write disk (CD-R/W), and a digital versatile disk (DVD).

Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

We claim:

1. A method for providing a pop-up repelling frame for use in a screen sharing session, comprising:
   providing a region on a host screen, during a screen sharing session, wherein a view of a first application is viewable within the region;
   repelling a view of a second application from entering the region, the second application being distinct from the first application, and the repelling including displaying the view of the second application on the host screen outside of the region, wherein the view of the second application is a pop-up window;
   detecting the pop-up window; and
   creating and displaying, in the view of the first application, a pop-up window prompt that signifies the pop-up window is attempting to enter the region in response to the detecting of the pop-up window, wherein the pop-up window prompt includes a drop-down menu, the drop-down menu including a query for performing at least one of the following: accepting all pop-ups pertaining to the first application, accepting all pop-ups pertaining to the second application, or repelling all pop-ups pertaining to the second application.

2. The method of claim 1, further comprising:
   hosting a screen sharing session.

3. The method of claim 1, wherein the region comprises a frame.

4. The method of claim 1, wherein the repelling step further comprises a host user specified authorization decision, based on a series of prompts, selected from the group consisting of: selectively repelling and automatically repelling.

5. The method of claim 1, further comprising:
   selectively allowing a view of a third application to be viewable within the region by either extending the border of the region on the host screen around the view of the third application, or by dragging the view of the third application into the region on the host screen.

6. The method of claim 1, wherein the second application is selected from the group consisting of: an instant messaging application, a calendar application, an application that sends an alert, and combinations thereof.

7. The method of claim 1, wherein the detecting and repelling steps further comprise using one selected from the group consisting of: hooks and windows.

8. The method of claim 1, further wherein the view of the second application may be viewable by a single user in the screen sharing session.

9. A system for providing a pop-up repelling frame for use in a screen sharing session, comprising:
   a system for providing a region on a host screen, during a screen sharing session, wherein a view of a first application is viewable within the region;
   a system for repelling a view of a second application from entering the region, the second application being distinct from the first application, and the repelling including displaying the view of the second application on the host screen outside of the region, wherein the view of the second application is a pop-up window;
   a system for detecting the pop-up window; and
   a system for creating and displaying, in the view of the first application, a pop-up window prompt that signifies the pop-up window is attempting to enter the region in response to the detecting of the pop-up window, wherein the pop-up window prompt includes a drop-down menu, the drop-down menu including a query for performing at least one of the following: accepting all pop-ups pertaining to the first application, accepting all pop-ups pertaining to the second application, or repelling all pop-ups pertaining to the second application.

10. The system of claim 9, further comprising:
    a system for hosting a screen sharing session.

11. The system of claim 9, wherein the region comprises a frame.

12. The system of claim 9, wherein the repelling system further comprises a host user specified authorization decision, based on a series of prompts, selected from the group consisting of: a selective repelling system and an automatic repelling system.

13. The system of claim 9, further comprising:
    a system for selectively allowing a view of a third application to be viewable within the region by either extending the border of the region on the host screen around the view of the third application, or by dragging the view of the third application into the region on the host screen.

14. The system of claim 9, wherein the second application is selected from the group consisting of: an instant messaging application, a calendar application, an application that sends an alert, and combinations thereof.

15. The system of claim 9, wherein the detecting and repelling systems further comprise a system using one selected from the group consisting of: hooks and windows.

16. The system of claim 9, further wherein the view of the second application may be viewable by a single user in the screen sharing session.

17. A program product stored on a recordable non-transitory medium for providing a pop-up repelling frame for use in a screen sharing session, which when executed comprises:

program code for providing a region on a host screen, during a screen sharing session, wherein a view of a first application is viewable within the region;

program code for repelling a view of a second application from entering the region, the second application being distinct from the first application, and the repelling including displaying the view of the second application on the host screen outside of the region, wherein the view of the second application is a pop-up window;

program code for detecting the pop-up window; and program code for creating and displaying, in the view of the first application, a pop-up window prompt that signifies the pop-up window is attempting to enter the region in response to the detecting of the pop-up window, wherein the pop-up window prompt includes a drop-down menu, the drop-down menu including a query for performing at least one of the following: accepting all pop-ups pertaining to the first application, accepting all pop-ups pertaining to the second application, or repelling all pop-ups pertaining to the second application.

18. The program product of claim 17, wherein the drop-down menu further includes a query for accepting the pop-up, and a query for repelling the pop-up.

19. The method of claim 1, wherein the drop-down menu further includes a query for accepting the pop-up, and a query for repelling the pop-up.

20. The system of claim 9, wherein the drop-down menu further includes a query for accepting the pop-up and a query for repelling the pop-up.

* * * * *